US008289830B2

(12) United States Patent
Becker-Szendy et al.

(10) Patent No.: US 8,289,830 B2
(45) Date of Patent: Oct. 16, 2012

(54) STORING DATA ON FIBER DATA STORAGE MEDIA

(75) Inventors: Ralph A. Becker-Szendy, Los Gatos, CA (US); Winfried W. Wilcke, Los Altos Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/639,737

(22) Filed: Dec. 16, 2009

(65) Prior Publication Data

US 2011/0141871 A1   Jun. 16, 2011

(51) Int. Cl.
  *G11B 7/00* (2006.01)
(52) U.S. Cl. ..................... 369/97; 369/44.17
(58) Field of Classification Search ............ 369/275.2, 369/275.3, 44.22, 94, 103, 44.17, 93, 97
  See application file for complete search history.

(56) References Cited

U.S. PATENT DOCUMENTS

| 4,275,141 A * | 6/1981 | Borrelli et al. ............ 430/270.1 |
| 4,323,640 A * | 4/1982 | Borrelli et al. ............ 430/353 |
| 4,341,863 A * | 7/1982 | Borrelli et al. ............ 430/346 |
| 4,365,257 A * | 12/1982 | Gerfast ............ 346/135.1 |
| 4,696,892 A * | 9/1987 | Abe et al. ............ 430/270.21 |
| 5,629,512 A | 5/1997 | Haga |
| 6,278,679 B1 | 8/2001 | Weiss et al. |
| 6,650,815 B2 * | 11/2003 | Hawtof et al. ............ 385/128 |
| 6,999,657 B2 | 2/2006 | Walt |
| 7,369,483 B2 * | 5/2008 | Slafer et al. ............ 369/275.4 |
| 2004/0009406 A1 | 1/2004 | Hesselink et al. |
| 2004/0257962 A1 | 12/2004 | Walker et al. |
| 2006/0013108 A1 * | 1/2006 | Maxwell et al. ............ 369/112.01 |
| 2006/0073392 A1 | 4/2006 | Erben et al. |
| 2006/0152783 A1 | 7/2006 | Butler et al. |
| 2006/0209587 A1 | 9/2006 | Bocian et al. |

OTHER PUBLICATIONS

IBM, "Photochromic Disk File," IBM Technical Disclosure Bulletin, Oct. 1971, p. 1362-1364, Yorktown, NY.
IBM, "High Speed Data Recording Device," IBM Technical Disclosure Bulletin, Mar. 1968, p. 1601-1602, Endicott, NY.

* cited by examiner

*Primary Examiner* — Nabil Hindi
(74) *Attorney, Agent, or Firm* — Kenneth L. Sherman, Esq.; Michael Zarrabian, Esq.; Sherman & Zarrabian LLP

(57) ABSTRACT

A method and apparatus for storing data is provided. One implementation involves providing a fiber medium for storing data, wherein the fiber medium has a characteristic configured to irreversibly change when exposed to write irradiation. The fiber medium is logically partitioned into cells along the length of the fiber medium. Data is stored in a cell of the fiber medium by exposing the cell to write irradiation to irreversibly change characteristic of the bulk of the cell.

17 Claims, 3 Drawing Sheets

STORING DATA ON FIBER DATA STORAGE MEDIA

BACKGROUND

1. Field of the Invention

The present invention relates generally to data storage, and more in particularly, to data storage media.

2. Background Information

With the expansion of information technology, increasing amount of data is recorded on data storage media for safekeeping and redundancy. Certain technologies such as high definition video technology generate large volumes of data. Conventionally, magnetic tape is used for mass data storage. However, magnetic tape is expensive, occupies large volume of space, and has limited durability (5-50 years). The limited durability requires tape archives to be re-read and re-copied regularly (every decade or so). As such, storing very large quantities of data inexpensively (both at low cost per byte and at low weight/volume per byte) for long periods of time (400 to 1000 years) remains challenging.

BRIEF SUMMARY

A method and apparatus for storing data is provided. One implementation involves providing a fiber medium for storing data, the fiber medium having a characteristic configured to irreversibly change when exposed to write irradiation having first attributes. The fiber is logically partitioned into cells along the length of the fiber medium. Data stored in a cell of the fiber medium by exposing the cell to write irradiation to irreversibly change characteristic of the bulk of the cell.

The fiber medium may have an irradiation absorption characteristic configured to irreversibly increase when exposed to write irradiation. Storing data in a cell of the fiber medium may then include storing data in a cell of the fiber medium by exposing the cell to write irradiation to irreversibly increase absorption characteristic of the bulk of the cell. The fiber medium may comprise a fiber of amorphous solids. The fiber may be processed by doping with a photosensitive substance to irreversibly increase when exposed to write irradiation. The fiber medium may comprise a glass fiber processed to irreversibly increase its irradiation absorption when exposed to irradiation. The irradiation may comprise an ultraviolet beam and the fiber medium may be about 1 μm to 10 μm in thickness.

Reading data from a cell of the fiber medium may comprise detecting irradiation absorption of the cell. Reading data from the cell may further include exposing the cell to read irradiation having second attributes, and detecting irradiation absorption of the cell, such that if the detected irradiation absorption of the cell is above an absorption threshold then the cell stores data. Different absorption levels may represent different data. Reading data from a cell may be performed at a lower intensity irradiation than writing. Reading data from a cell may be performed at a longer wavelength irradiation than writing. Writing and reading data is performed while the fiber moves past a read/write head.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for storing information on processed fibers of glass or quartz, which are examples of microcrystalline and amorphous solids, as well as operation and/or component parts thereof. While the following description will be described in terms of glass fibers for clarity and to place the invention in context, it should be kept in mind that the teachings herein may have broad application to other types of materials (e.g., quartz), systems, devices and applications.

In tape information storage technology, a very thin magnetic layer is glued on a relatively thick plastic tape that provides mechanical support for the magnetic material. The magnetic material is for storing data only. The plastic tape only functions as mechanical support for the magnetic material. As such, much of the storage volume in terms of cubic meters is used for storing the plastic tape that supports the thin magnetic layer.

According to an embodiment of the invention, thin fibers of glass or quartz, which are examples of microcrystalline and amorphous solids are processed and used as data storage media. Storing data involves changing a physical characteristic (such as irradiation absorption, transparency) of the fiber. The fibers may be very thin, and can retain high data density. Because the storage process involves only such fibers and inorganic chemistry, the fiber is inexpensive and stored data is very persistent for long periods of time (e.g., 400 to 1000 years).

Figure 1:
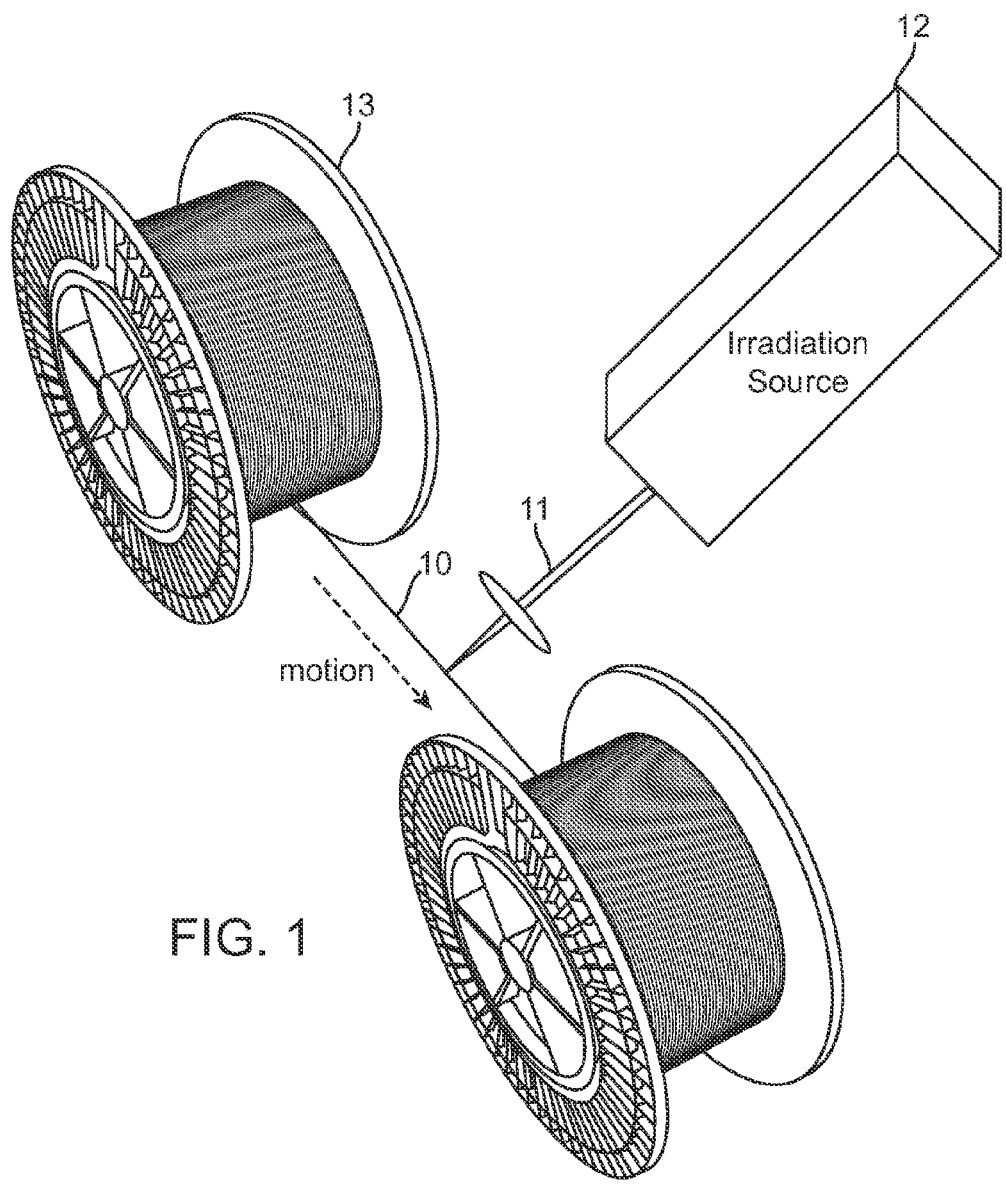
FIG. 1 illustrates an example process for utilizing a fiber medium for data storage, according to an embodiment of the invention.

Referring to FIG. 1, in one embodiment, such a thin fiber 10 is used as a bulk data storage medium. To write data, optical absorption of the fiber is changed by a process of exposing the fiber to write irradiation of certain attributes such as a strong and focused ultraviolet (UV) beam 11 of a laser 12. To read data, the fiber is exposed to read irradiation of certain attributes (such as visible light) to detect the changed property of the fiber. If the changed property (e.g., absorption level) of the property is above a threshold, then the fiber is considered to be storing data.

The fiber diameter is selected to maximize the physical storage density, while taking into account IO (input/output or read/write) speed and longevity of the data. Substantially, the entire bulk of the fiber media is used for data storage (versus tape wherein only the thin magnetic layer is used for storing data).

This allows reliable storage of large amounts of data for a long period (e.g., over 400 years). The information in such a fiber using bulk of the fiber, wherein the fiber (or strand) provides both the mechanical support and the storage medium (i.e., the data storage material provides mechanical support for itself).

The fiber is processed by doping with a compound which causes any portion of the fiber that is exposed to radiation to permanently turn dark. The process of irradiation changes one of the bulk properties of an exposed portion of the fiber in an irreversible fashion (e.g., darkening it), wherein the changed portion represents a recorded unit of information unit relative to unchanged portions. The amount of change in the property can have multiple levels to represent multiple types of information stored.

In one implementation, a thin (e.g., on the order of 1 μm to 10 μm) glass fiber is doped with a material that changes the light absorption of the glass when irradiated, for example with UV light. The fiber is doped with a photosensitive material, such as AgCl. The processed fiber has photosensitive properties, wherein the fiber turns irreversibly dark when exposed to UV radiation. Photosensitive means that the material changes properties irreversibly when exposed to certain radiation.

Figure 2:
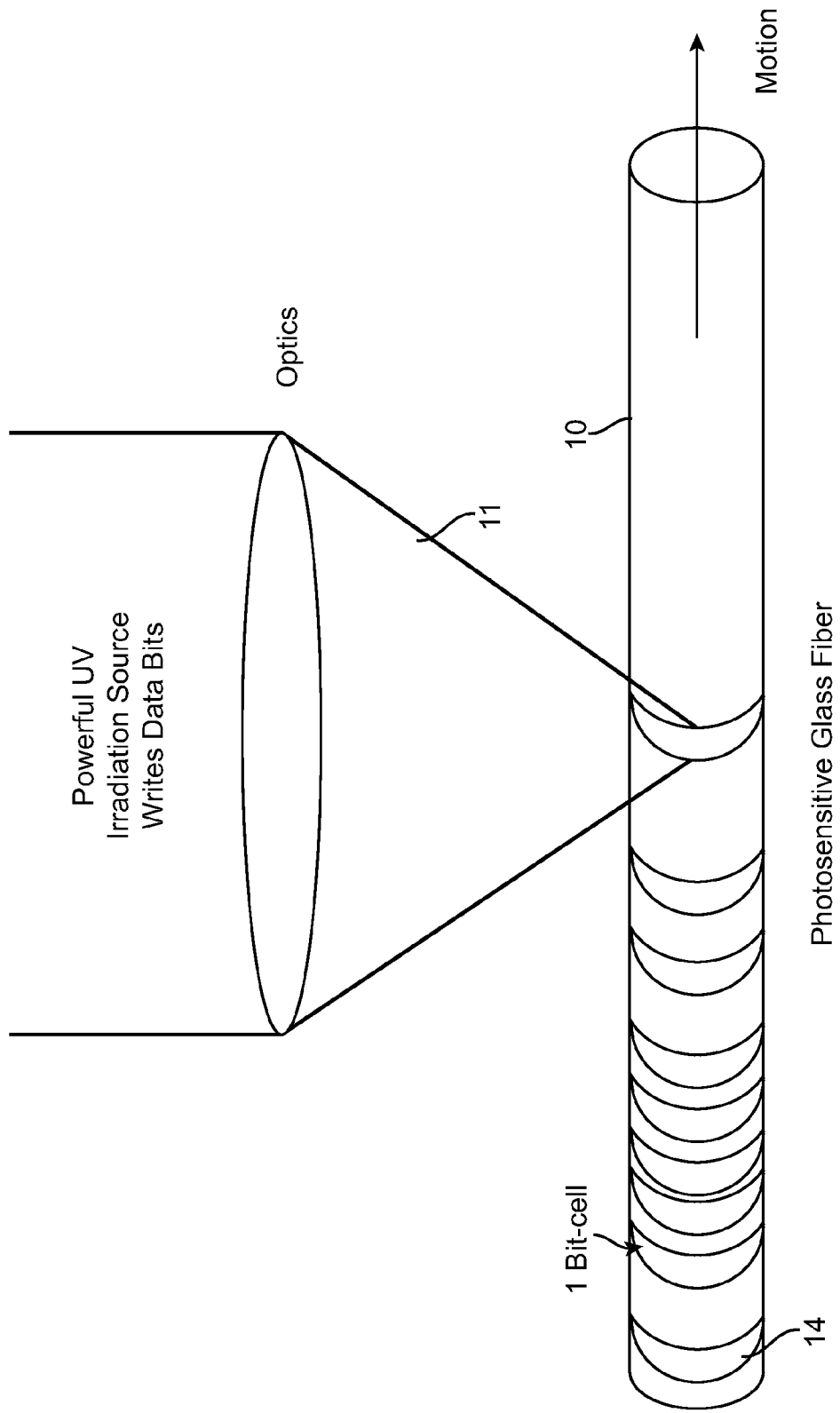
FIG. 2 illustrates an example process for recording data on a fiber medium, according to an embodiment of the invention.
Figure 3:
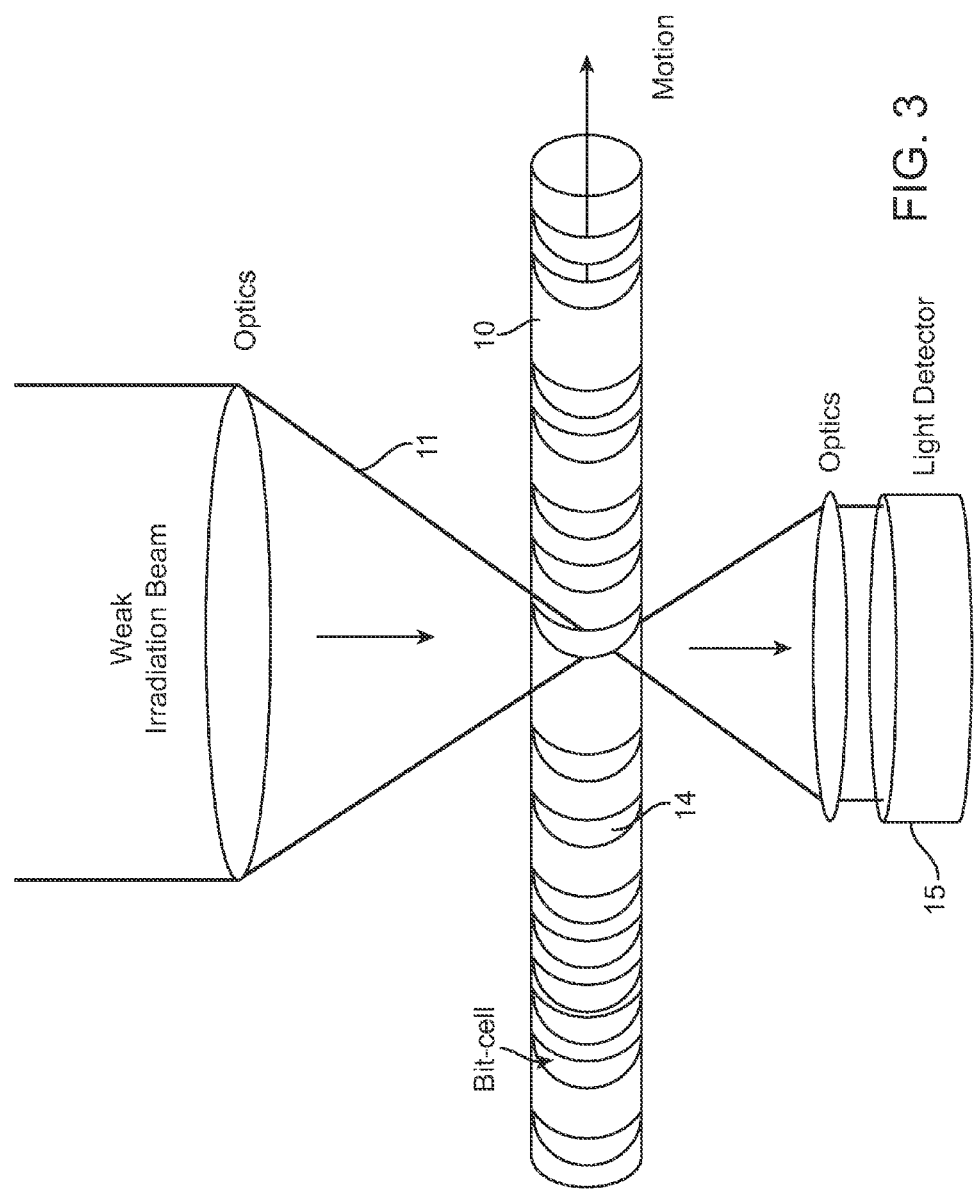
FIG. 3 illustrates an example process for reading data from a fiber medium, according to an embodiment of the invention.

The fiber is read and written perpendicularly, conceptually by dividing the glass volume into optical "cells" 14 as shown by the example write and read operations in FIGS. 2 and 3, respectively. To write the data, the fiber is irradiated, for example with a modulated UV laser. To read the fiber, the fiber is illuminated either at a low power level (which does not cause further darkening) or at lower energies (e.g., visible light, Infra Red (IR)). Referring to the write process in FIG. 2, recording data is performed as the fiber moves under a read/write head (e.g., irradiation source 12 in FIG. 1) which illuminates the fiber 10 using a high-powered UV light source, for example a laser, modulated to encode the write data. For example, using a typical UV laser illuminator at a wavelength of 337 nm (Nitrogen laser) or 248 nm (KrF excimer laser), a 200 nm (0.2 μm) region of the fiber can be illuminated, thereby darkening an individual cell 14 that occupies a spatial volume of $0.2\ \mu m \times (1\ \mu m)^2 = 2 \times 10^{-19}\ m^3$. Each cell 14 can store at least 1 bit (unit) of information (multi-level storage provides more storage capacity).

The recorded information bits can be read back from the fiber 10 by measuring properties of the fiber (a changed property of a portion of the fiber represents a cell that stores information relative to a portion of the fiber with unchanged property). Reading may be performed at a much longer wavelength than writing. For example, optical or near-UV irradiation beam may be used (using focusing or electronics to handle "crosstalk" between neighboring bits). Further, as shown in FIG. 3, a UV beam at much lower power densities can be used for reading, to prevent the fiber characteristics from being changed again when reading. As the fiber moves under a read/write head such as detector 15, the beam passes through the fiber and the beam intensity exiting the fiber is detected by the detector 15. When the detector 15 detects reduced beam intensity due to the beam passing through a cell 14, then a bit of recorded information is detected.

The read/write process naturally partitions the fiber into unit cells. The cells are separated by the relative motion between the media and the read/write station (i.e., light source, detector, optics, etc.). The cells are arranged along the direction of the media motion. Generally the fiber 10 possesses physical characteristics, such that the storage process changes the bulk of the fiber, not a thin layer as in magnetic tape. The storage cells are addressed only in the direction of motion of the media, not perpendicular to it The fiber allows cell size to be reduced, with one track using all the material without an inert carrier, essentially maximizing volumetric storage density. For increased storage density, the cells may be made smaller or more bits may be stored into each cell (multi-level storage).

The fiber may be stored on spools/reels 13 (FIG. 1) which may be housed inside cartridges (not shown). Assuming a macro packing efficiency of only 50%, then half the space is used for spool cores that the fiber is wound on, and the gaps between round spools. This leads to a density of 2.5 Pb/l, equivalent to about 1 Pb/kg (glass has a density of about 2.6 g/cm$^3$). Assuming that a volume of $2 \times 10^{\char`\^}-19\ m^{\char`\^}3$ is written at a spooling speed of 25 m/s (the speed at which glass fiber is manufactured), IO speed per fiber is 125 Mb/s. Multi-level recording or higher transport speeds provide higher IO speed. An example fiber has the following characteristics:

Fiber diameter: 1 μm to 10 μm;
Bit cell length: 200 nm-400 nm;
Bits per cell: 1-5 bits;
1 bit volume=$2 \times 10^{-19}\ m^3$;
Packing efficiency: 50%;
Density: 2.5 Pbit/l, 1 Pbit/kg;
Pbit/l: 1 Pbit/kg;
Spooling speed: 25 m/s;
1 bit length: 200 nm;
Read/Write speed: 125 Mbit/s.

Making photosensitive glass is an old and well-known technique. The most common chemical that is added to glass (i.e., doping) to make it photosensitive is silver chloride (AgCl). The process for adding doping materials to glass before extruding it into fibers is also well known. Common photosensitive glass (such as used for crafts) fibers are useful with the present invention.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of storing data, comprising:
   providing a fiber medium for storing data, the fiber medium having a characteristic that irreversibly changes when exposed to write irradiation having first attributes, wherein the fiber is stored on a reel and has an irradiation absorption characteristic that irreversibly increases when exposed to write irradiation;
   logically partitioning the fiber medium into cells along the length of the fiber medium; and
   storing data in a cell of the fiber medium by exposing the cell to write irradiation to irreversibly change characteristic of the bulk of the cell by increasing absorption characteristic of the bulk of the cell.

2. The method of claim 1 wherein the fiber medium comprises a fiber processed by doping with a photosensitive substance to irreversibly increase darkness of color when exposed to write irradiation.

3. The method of claim 1 wherein the fiber medium comprises an amorphous solid processed to irreversibly increase its irradiation absorption when exposed to said write irradiation.

4. The method of claim 1 wherein the fiber medium comprises glass fiber wire having a diameter range between 1 µm to 10 µm and the write irradiation comprises an ultraviolet light laser beam.

5. The method of claim 1 further comprising reading data from a cell of the fiber medium by detecting irradiation absorption of the cell.

6. The method of claim 5 wherein reading data from the cell further includes exposing the cell to read irradiation having second attributes, detecting irradiation absorption of the cell, such that if the detected irradiation absorption of the cell is above an absorption threshold then the cell stores data.

7. The method of claim 6 wherein reading is performed at a lower intensity or irradiation than writing.

8. The method of claim 6 wherein reading is performed at a longer wavelength irradiation than writing.

9. The method of claim 5 wherein writing and reading data is performed while the fiber moves past a read/write head.

10. A data storage medium, comprising:
   an elongate fiber medium for storing data, the fiber medium having a characteristic that irreversibly changes when exposed to write irradiation having first attributes, wherein the fiber is spooled; and
   the fiber medium is partitioned into cells along the length of the fiber medium, such that exposing the cell to write irradiation irreversibly changes characteristic of the bulk of the cell representing data stored in the cell,
wherein the fiber medium has an irradiation absorption characteristic that irreversibly increases when exposed to write irradiation, such that exposing the cell to write irradiation irreversibly increases absorption characteristic of the bulk of the cell.

11. The data storage medium of claim 10 wherein the fiber medium comprises a fiber processed by doping with a photosensitive substance to irreversibly increase when exposed to write irradiation.

12. The data storage medium of claim 11 wherein the fiber medium comprises
   an amorphous solid processed to irreversibly increase its irradiation absorption when exposed to said write irradiation.

13. The data storage medium of claim 12 wherein the write irradiation first attributes comprises an ultraviolet light beam.

14. The data storage medium of claim 12 wherein the fiber medium is about 1 µm to 10 µm in diameter.

15. The data storage medium of claim 10 wherein data is stored on a cell of the fiber medium, and the data is read from a cell of the fiber medium by detecting irradiation absorption of the cell.

16. A method of reading data from a fiber medium having a characteristic that irreversibly changes when exposed to write irradiation having first attributes, the method comprising:
   exposing a cell of the fiber medium to read irradiation having second attributes;
   detecting irradiation absorption of the cell,
such that if the detected irradiation absorption of the cell is above an absorption threshold then the cell stores data, wherein the fiber medium is stored on a spool.

17. The method of claim 16 wherein reading is performed at a lower intensity and/or wavelength irradiation than writing.

* * * * *